United States Patent
Teja

[11] B 3,913,955
[45] Oct. 21, 1975

[54] SEALED COUPLING FOR EXHAUST PIPE SECTIONS

[75] Inventor: Mohindar Singh Teja, Dubuque, Iowa

[73] Assignee: Deere & Company, Moline, Ill.

[22] Filed: July 5, 1973

[21] Appl. No.: 376,799

[44] Published under the Trial Voluntary Protest Program on January 28, 1975 as document no. B 376,799.

[52] U.S. Cl. ................................ 285/337; 285/408
[51] Int. Cl.² ................... F16L 17/00; F16L 19/00; F16L 21/02
[58] Field of Search ........... 285/337, 171, 367, 366, 285/365, DIG. 18, 407, 408, 410, 411, 413, 415

[56] References Cited
UNITED STATES PATENTS

| 755,994 | 3/1904 | Broome | 285/367 X |
| 2,201,372 | 5/1940 | Miller | 285/337 X |
| 2,217,664 | 10/1940 | Berger | 285/DIG. 19 |

Primary Examiner—Richard J. Scanlan, Jr.

[57] ABSTRACT

First and second pipe sections have overlapped end portions with the first pipe section telescopically receiving the second pipe section and having a flared end angled from and extending annularly about the second pipe section and cooperating therewith to define an axially open recess. A split metal sealing ring is received in the recess and held tightly against the flared end of the first pipe section by a clamping ring means having an inwardly opening annular groove in which the flared end of the first pipe section and the sealing ring are received.

6 Claims, 3 Drawing Figures

SEALED COUPLING FOR EXHAUST PIPE SECTIONS

BACKGROUND OF THE INVENTION

The present invention relates to a pipe coupling and more specifically relates to a coupling especially adapted for joining the ends of exhaust pipe sections.

Vehicle exhaust pipe assemblies commonly include two or more interconnected pipe sections and/or include a muffler joined to the end of one pipe section. For the safety of the operator, it is imperative that the joints between the pipe sections and/or the pipe section and the muffler be tight enough to prevent the leakage of exhaust gases therethrough.

Some muffler joints are constructed such that a tight fit between the connected ends on the muffler sections is relied upon for preventing leakage through the joint at the interconnection, however, these constructions are not entirely satisfactory, since manufacturing tolerances of muffler tubing is such that sometimes the fit between the muffler sections is not tight enough to prevent leakage therethrough. Also, in cases where the fit is tight enough, it is often not possible to disconnect the joints to replace a worn-out muffler section without ruining the other muffler sections which cooperates to form the joint due to the fact that the sections are corroded or otherwise stuck together.

SUMMARY OF THE INVENTION

According to the present invention, there is provided a novel pipe coupling which overcomes the above-noted disadvantages of known pipe couplings.

Thus, an object of the invention is to provide a pipe coupling which is of a simple, durable construction which prevents leakage despite variances in tubing sizes resulting from manufacturing tolerances.

Another object is to provide a pipe coupling which can be disassembled without ruining either of the pipe sections which it couples. A further object of the invention is to provide a pipe coupling having parts which are all equally tolerant to the working environment.

In general, the pipe coupling of the invention is adapted to couple first and second pipe sections, the first section having an end portion telescopically receiving an end portion of the second section and having an outwardly flared end. A split steel ring forms a sealing member which is received over the second pipe section and is wedged against the flared end of the first pipe section by means of a two-piece steel clamp which has an annular inwardly opening V-shaped groove which receives the split ring and the flared end of the first pipe section. The split steel ring is circular in cross section and thus is in line contact with the second tube section and the flared end of the first tube section to thus prevent the leakage of exhaust gases. This line contact of the sealing ring makes it possible for the joint to be easily disassembled without ruining either of the tube sections.

DESCRIPTION OF THE PREFERRED EMBODIMENT

Figure 1:
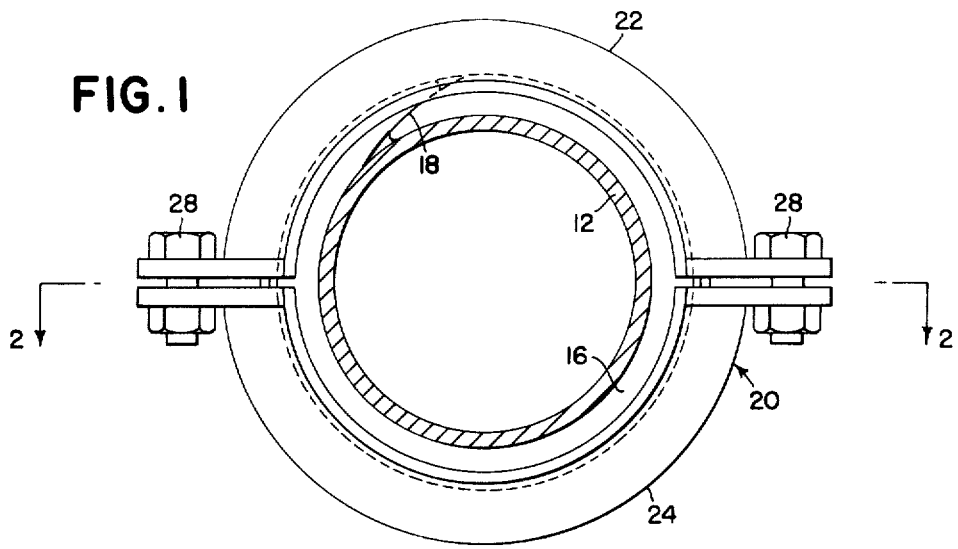
FIG. 1 is a longitudinal sectional view through the telescoped ends of two pipe sections, showing the manner in which the present invention is applied thereto, to produce a tight joint.
Figure 2:
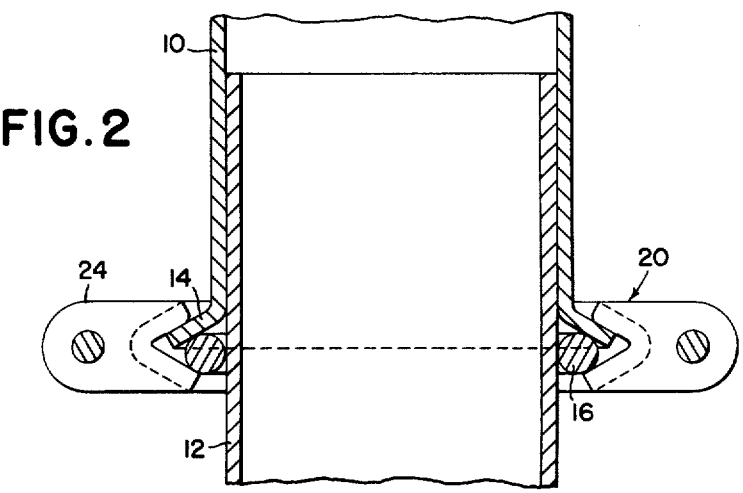
FIG. 2 is a transverse sectional view taken along line 2—2 of FIG. 1.
Figure 3:
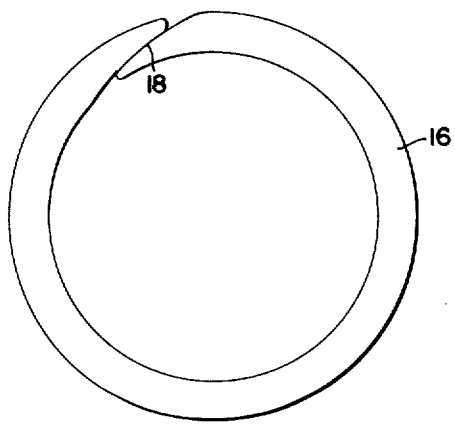
FIG. 3 is a side elevational view of the sealing ring.

Referring now to the drawing, numerals 10 and 12 respectively indicate the ends of first and second length or sections of pipe, the second section having an end portion telescopically received in an end portion of the first pipe section. The first pipe section 10 has an outwardly flared end 14 which extends annularly about the second pipe section 12 and defines an acute angle therewith and thus forms an axially open annular recess. Received on the pipe section 12 and positioned in the recess is a sealing ring 16. The sealing ring 16 is circular in cross section and is split, as at interface 18, so as to have overlapping ends which meet at a plane extending obliquely through the ring in a direction substantially tangential to an inner surface location of the ring. The ring 16 is sized such that it is deformed axially when it is positioned on the second tube section 12 as shown in FIG. 1 to thus be in biased engagement with the section 12 due to the inherent resiliency of the ring. It is to be noted that the ring ends remain in contact at the interface 18 even though the ring is deformed thus maintaining the integrity of the sealing function of the ring 16. The sealing ring 16 is held in place against the flared end 14 of the first tube section 10 through means of a clamp 20 composed of two separate halves or sections 22 and 24, each section having a body portion substantially semicircular in form and being V-shaped in cross section so as to form an annular inwardly opening groove when the two halves are together, as shown. Each half or member of the clamping ring 20 is provided at each end with an outwardly extending lug, and the two halves when brought into position are connected on opposite sides of the pipe sections 10 and 12 by bolts 28 passing through said lugs and having nuts thereon serving to draw the two halves bodily towards each other, the groove receiving the flared end 14 of the first pipe section and the steel ring 16 and acting thereon to wedge the two together. Thus, when the clamping ring 20 is in place, the ring 16 will be in line contact with the flared end 14 of the first pipe section 10 and the outside of the second pipe section 12.

Thus it will be appreciated that a tight seal will be provided through the coaction of the clamp ring 20, the sealing ring 16 and the flared end 14 of the first pipe section 10 and it will be further appreciated that the joint thus formed can be easily disassembled by breaking loose the seal affected by line contacts of the sealing ring 16 once the clamping ring 20 is removed.

Also, it will be appreciated that the split sealing ring 16 will accommodate itself to pipe sections varying in sizes because of manufacturing tolerances.

I claim:

1. A tubing assembly comprising: a first tube section having a central longitudinal axis and including an end portion flared radially and axially outwardly relative to said axis and thus forming an annular flange; a second tube section having an end portion telescopically received in said first tube section; said annular flange cooperating with said second tube section to define an annular, axially opening recess; a metal sealing ring being partially received in said recess and tightly embracing said second tube section; said sealing ring being split so as to define opposed overlapped ends engaged at an interface extending substantially tangential to an inner surface location of the ring; a clamping ring having an annular inwardly opening groove receiving said flange and said sealing ring; and said groove being so configured that surfaces thereof act to wedge said sealing ring into contact with said flange and second tube section.

2. The tubing assembly defined in claim 1 wherein said sealing ring is circular in transverse cross section and thus makes line contact with said flange and said second tube section.

3. The tubing assembly defined in claim 1 wherein said sealing ring is mounted on said second tube section in a radially outward deflected state.

4. A tubing assembly comprising: first and second tubes having overlapped ends with the end of the second tube being located in the first tube; said first tube having an end portion angled outwardly from and extending annularly around said second tube and cooperating therewith to define an annular recess; a split, relatively hard, resilient sealing ring being partially received in said recess and having opposed overlapped ends meeting at an interface extending substantially tangential to an inner surface location of the ring; a clamping ring means mounted in clamping engagement with and having an annular groove receiving the annular end portion of said first tube and the sealing ring; and said annular groove being configured such that the sealing ring is urged against the annular end portion of said first tube and said second tube by the action of said clamping ring means.

5. The tubing assembly defined in claim 4 wherein said sealing ring is circular in transverse cross section and thus makes line contact with said flange and said second tube section.

6. The tubing assembly defined in claim 4 wherein said sealing ring is mounted on said second tube section in a radially outward deflected state.

* * * * *